US006842740B1

(12) United States Patent
Jeran et al.

(10) Patent No.: US 6,842,740 B1
(45) Date of Patent: Jan. 11, 2005

(54) METHOD FOR PROVIDING AUTOMATIC PAYMENT WHEN MAKING DUPLICATES OF COPYRIGHTED MATERIAL

(75) Inventors: Paul L Jeran, Meridian, ID (US); Angela K. Hanson, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/468,256

(22) Filed: Dec. 20, 1999

(51) Int. Cl.[7] .............................................. G06F 17/60

(52) U.S. Cl. ............................ 705/39; 705/13; 705/23; 705/40; 705/44

(58) Field of Search ............................ 705/39, 13, 23, 705/40, 44

(56) References Cited

U.S. PATENT DOCUMENTS 4,179,212 A * 12/1979 Lahr ........................ 355/14 R
5,331,140 A * 7/1994 Stephany .................... 235/462
5,444,779 A * 8/1995 Daniele ......................... 380/3
5,530,520 A * 6/1996 Clearwater .................. 355/201
5,532,920 A * 7/1996 Hartrick et al.
5,634,012 A * 5/1997 Stefik et al. .................. 705/39
5,892,900 A 4/1999 Ginter et al. ............... 395/186
6,154,738 A * 11/2000 Call .............................. 707/4
6,282,653 B1 * 8/2001 Berstis et al. ............... 713/200

FOREIGN PATENT DOCUMENTS

US WO 01/55907 A2 * 2/2001 ........... G06F/17/30

OTHER PUBLICATIONS

Ebinghouse, C. Permission, Permission, Who's Got Permission, Searcher, v4, n1, , Jan. 1996, 5 pages.*

* cited by examiner

*Primary Examiner*—Vicent Miller
*Assistant Examiner*—Charles Kyle

(57) ABSTRACT

A method and system for providing payment when duplicating a document containing copyrighted material, comprising the steps of: locating and electronically reading a billing mark, if it exists, on a document to be copied/scanned; obtaining machine readable billing data by way of the billing mark; authorizing payment of a fee to a copyright owner; and duplicating the document.

18 Claims, 2 Drawing Sheets

METHOD FOR PROVIDING AUTOMATIC PAYMENT WHEN MAKING DUPLICATES OF COPYRIGHTED MATERIAL

BACKGROUND OF THE INVENTION

1. Field of the Invention

The present invention relates generally to automated document management systems, and more particularly to a method and a system for providing automatic payment for making copies of copyrighted material.

2. Description of the Related Art

Modern computing methods enable documents to be copied rapidly and with minimal oversight. Among the modern devices which have enabled the proliferation of documents is the copy machine. Often copies are made of copyrighted material without appropriate compensation being made to the owner of the copyright. Failure to pay copyright license fees is, in part, caused by the difficulty in the copying person knowing how to pay and where to direct the monies. In a corporation, this unauthorized copying becomes a significant concern because the company is liable for the actions of its employees. In order to control unauthorized copying, some companies require their employees to order preprints from the publisher, or to negotiate a direct arrangement with the copyright holder for the right to make a predetermined number of copies. This activity involves a time lag between when the data is desired and when the information is available. In actual practice, the article is typically copied on an office copy machine without authorization. This unauthorized copying would not provide the copyright holder with any payment for the copy of his copyrighted work, subjects the employer to potential liability, and in the case of documents with detailed graphics (vector and raster), results in an inferior copy being made as compared to the original document.

SUMMARY OF THE INVENTION

Briefly, the present invention comprises in one embodiment a method for providing payment when duplicating a document containing copyrighted material, comprising the steps of: locating and electronically reading a billing mark, if it exists, on a document to be copied/scanned; obtaining machine readable billing data by way of the billing mark; authorizing payment of a fee to a copyright owner; and duplicating the document.

In a further aspect of the invention, the locating a billing mark step comprises locating a billing data ID that references billing data accessible at a computing resource separate from a machine on which the locating step occurred; and wherein the obtaining step comprises obtaining the billing data from the computing resource.

In a yet further aspect of the invention, the locating a document ID step comprises locating a document ID that references a URL location containing the billing data; and wherein the obtaining step comprises obtaining the billing data from the URL location.

In a yet further aspect of the invention, the locating a billing mark step comprises locating a billing mark containing billing data and a document ID referencing an address containing source data for the document.

In a yet further aspect of the invention, the locating step comprises locating the billing mark in a predetermined position on the document relative to a human-visible item.

In a yet further aspect of the invention, the transferring funds step comprises: displaying a duplicating cost to the user for at least one duplicating option; and providing the user with an opportunity to accept or reject the at least one duplicating option.

In yet a further aspect of the invention, the displaying step includes displaying a different duplicating cost for copying and for printing the document based on source data for the document.

In yet a further aspect of the invention, the displaying step comprises displaying at least one option to print additional information when the document is duplicated and a duplicating cost for printing the additional information; and providing the user with an opportunity to accept or reject the printing of the additional information.

In a second embodiment of the invention, a document is disclosed comprising: a document medium containing human-visible items to be copied; and a computer-readable mark disposed on the medium for obtaining billing data to reproduce the items on a second medium.

In a third embodiment of the present invention, a system is disclosed for providing payment when duplicating a document containing copyrighted material, comprising: logic for locating a computer-readable billing mark, if it exists, on a document to be duplicated; logic for obtaining billing data by way of the billing mark; logic for transferring funds from a selected account to an account designated in the billing data; and logic for duplicating the document.

DETAILED DESCRIPTION OF THE PREFERRED EMBODIMENT

The present invention comprises an automated method and a system for duplicating a document containing copyrighted material, wherein the owner of the copyrighted material is compensated for the making of that copy. The invention is premised on the use of machine-readable code formed on a substrate or medium to be copied. The machine-readable code, in one aspect, may describe a location of a set of data objects in a billing database. Alternatively, the machine-readable code may comprise the billing data itself.

It should be noted that numerous methods are available for providing a machine-readable code on a medium or a substrate. One class of methods is to hide the code within the primary image. Such hiding can be accomplished by utilizing particular digital encoding, such as, for example, font pattern modifications, including, half-tone screen, intercharacter spacing modification, and dithering patterns. Another method is to place the machine-readable code on a portion of a document that is not normally printed upon with a primary image. Such portions can include, for example, one or more of the corners of a document. The machine-readable code can be stored in such portion, as for example a pattern of dots or lines. Such pattern could, for example comprise a barcode. Note that if hidden or camouflaged machine-readable code is used, the camouflaged code can be in the form of half-tone marking within an image prepared on the substrate, or in the form of an ink which is not detectable when viewed with only visible wavelength light, i.e., for example an ink that is detectable only using infrared or ultraviolet wavelengths.

Alternatively, the code could be formed by having a person write the code on the substrate.

It should be noted that the machine-readable code may be located anywhere on the substrate or the medium including the top portion, a bottom portion, side margins of a document, or in an image like a company logo or with a photograph, or in or adjacent to a copyright notice.

In applications where a barcode is utilized, large amounts of data can be encoded by utilizing two-dimensional barcodes. In applications where a person writes the code on the substrate, the code may be machine-readable when read with a machine coupled with handwriting-recognition software.

In applications where the code on the substrate or medium comprises a reference to a location of data objects in a database, the code may comprise simply a serial number, an access code, or a URL address corresponding to an Internet location at which the data objects are stored. These data objects can then be accessed through a network connection. In particular applications, the machine-readable code can be formed on a substrate with a machine configured to support voice input and to mark or annotate the substrate for further action/workflow.

Figure 1:
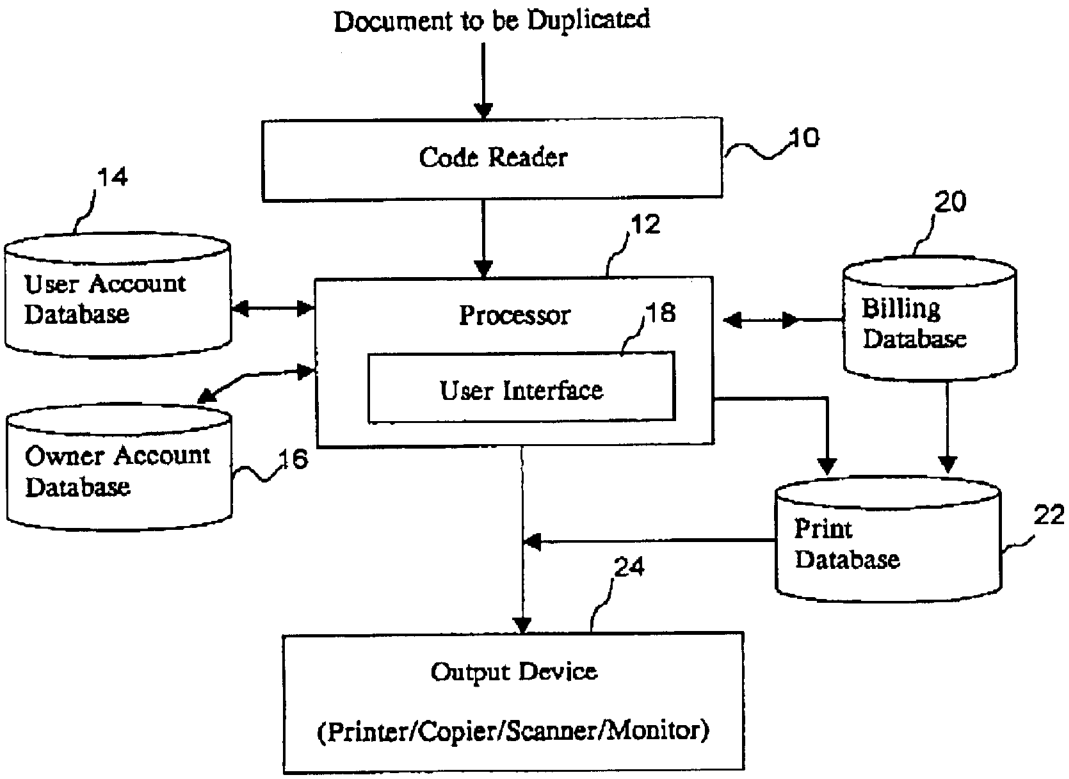
FIG. 1 is a schematic block diagram of the basic configuration for the present invention.

Referring now to FIG. 1, a substrate or a medium to be duplicated is first read with a code reader 10 which is designed to locate and read the machine-readable code on the substrate or medium. By way of example, but not by way of limitation, this code reader 10 may conveniently be implemented by a standard handheld scanner or by a scanning machine. Note that if a scanner is utilized, it can be configured to digitize the machine-readable code. As noted, the scanner can be a handheld device, such as, for example, a personal digital assistant (PDA), or a larger device into which the substrate or medium is fed. The scanner can be utilized to scan the entirety of a substrate or a medium, or just a portion of the substrate or medium. It may be programmed to search for the code in a particular location on the substrate or medium, or within or with reference to a particular mark.

The output code from the code reader 10 is applied to a processor 12 which decodes the code using a decoding algorithm designed for the particular code chosen. The processor 12 is shown as a single processor, however it may be comprised as a plurality of separate processors, depending on the system configuration.

If the information decoded at the processor 12 comprises the actual billing information, including the appropriate account number for the copyright owner or other appropriate account, as well as the billing amount, then in one embodiment of the invention the billing amount can be transferred by network directly to a user account database 14. The user account database 14 may simply comprise data including a debit or credit card account number from which to transfer funds. Funds may then be transferred from the user account referenced in the user account database to an owner account referenced by an owner account database 16.

It should be noted that these databases can be remotely located, or can be located onboard with the processor 12. Alternatively, the databases may be accessible on a network separate from the processor 12 and with which the processor 12 is in data communication by any convenient means, including satellite. Although the databases 14 and 16 are shown as single databases, it is to be understood that these databases can comprise either a single location of data storage, or a plurality of separate locations of data storage.

In a further aspect of the invention, the processor 12 may include or be connected to a user interface 18 wherein the billing amount is displayed to a user on a screen. In one embodiment, an ACCEPT button may be provided on the user interface to allow the user to accept the charges, and thereby initiate the transfer of funds from the user's account to the owner's account. In a further aspect of the invention, provision could be made to allow for a cash transaction. In this regard, a standard dollar bill or a quarter receiving machine could be provided in combination with the user interface 18 to allow the user to pay for the copying transaction at the user location.

If the machine-readable code on the substrate or the medium comprises a reference number or an access code or a URL address corresponding to a location in a database wherein detailed billing information or other information such as targeted advertising may be contained, then this decoded reference number may be sent to a database 20, which may be at one or more remote locations connected by one or more networks. The database 20 may then provide the amount of the copying charge back to the processor 12 to be displayed on the user interface 18. The billing database 20 would also provide the owner account number to which to transfer funds for an automated fund transfer transaction. Additionally, in a preferred embodiment, the database 20 may include targeted advertising to be displayed during the transaction with the user.

In a further aspect of this configuration, the user may be given a choice of making a copy of the document by a standard copier technique at the printer/copier/scanner 24, or paying a higher charge and having a high quality original printing of the document at the printer/copier/scanner 24. In this aspect of the invention, the decoded machine-readable code may include a reference number to the original source data or a print ready file located in a print database 22, which may be located at one or more remote locations connected by one or more networks. Note that the print ready file could comprise a simple Postscript file or a raster file or any file that is output device independent. This original source data from the print database 22, after appropriate conversion in a print-creating application to a print ready file, may be sent directly to a printer/copier/scanner device 24 to allow the printing of a high quality original document. Alternatively, the access number or reference number for the original source data or the print ready file in the print database 22 may be contained in the billing file in the database 20. This reference number or access number to the source data or print ready file in the print database 22 may then be sent directly from the billing database 20 to the print database 22, or may be sent back to the processor 12, which in turn, may send the access number or reference number to the print database 22. The print database may also include additional information options to be discussed below.

It should be noted that the printer/copier/scanner 24 is disclosed as part of a preferred embodiment of the present invention. The present invention is not limited to having all three functions of printing, copying, and scanning. Any one of these functions alone, or in combination with one or more other functions could be utilized to implement the present invention. Alternatively, the device 24 could be implemented simply by a monitor which allows the user to read the document, but does not allow the user to copy or print or scan the document.

Figure 2:
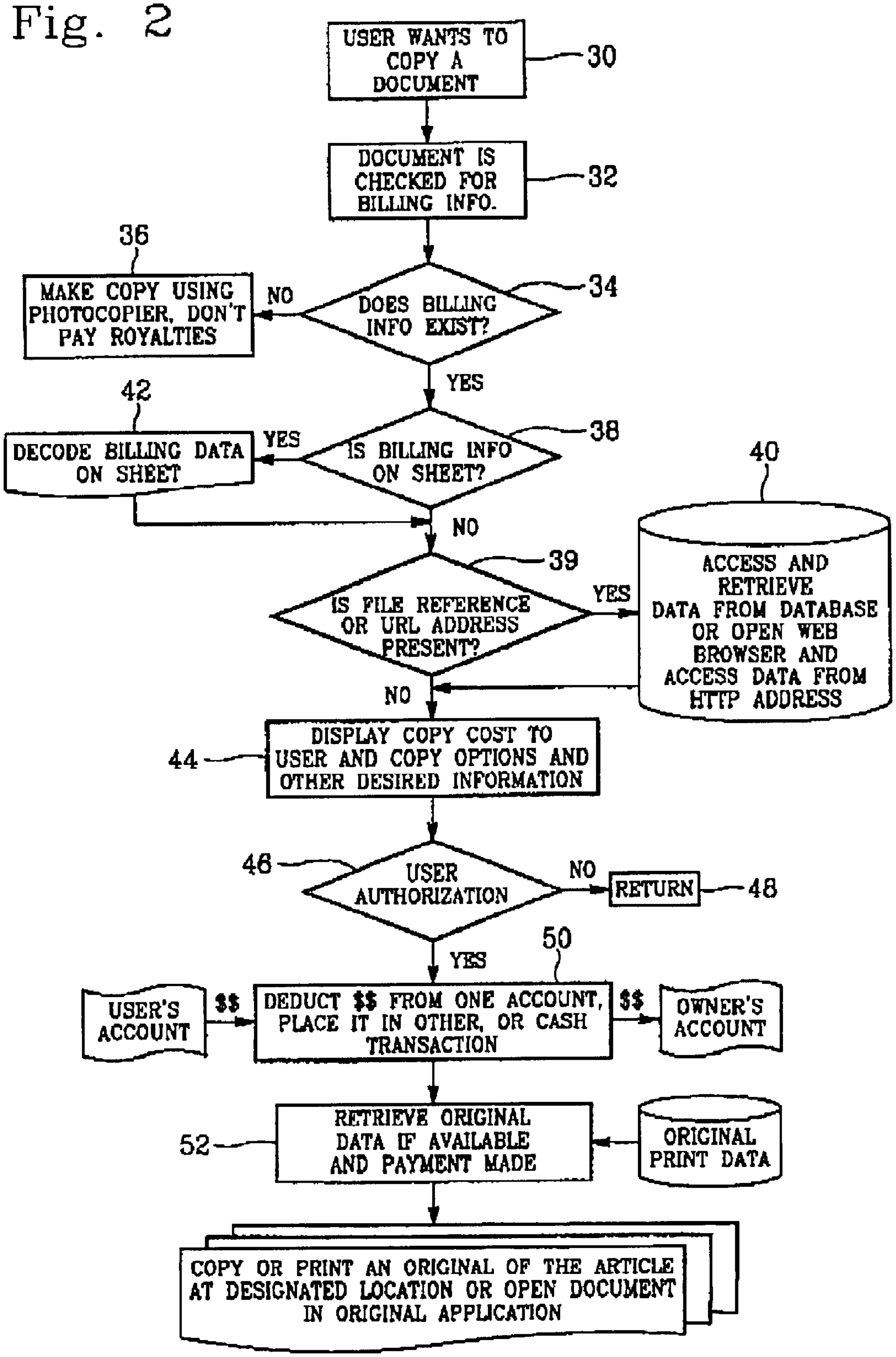
FIG. 2 is a block diagram flowchart of a computer program that may be used to implement the present invention.

Referring now to FIG. 2, there is shown a block diagram of the execution of a computer program which may be used to implement the present invention. The execution begins in block 30 with a user determining that it wants to either copy, or scan, or print or simply view a document. The execution of the program then moves to block 32 wherein the substrate or the document medium is scanned or checked for computer billing information. As noted previously, this billing information may be encoded visibly or invisibly on the document. Additionally, this billing information may comprise simply a reference number, or an access code, or a URL address to a billing database 20, or it may comprise the actual billing information itself. The execution then moves to block 34 wherein it is determined whether the billing information has been found on the substrate or the document. If the answer is NO, then the execution moves to block 36 and the system can be instructed to either make a copy using a photocopier without the payment of royalties, or the system can be instructed to prevent the use of the photocopier or can be instructed to take some other action.

If the answer to block 34 is YES, then the execution moves to block 38 wherein it is determined whether the actual billing information is located in the code itself. If the billing information is located on the document, so that the answer to block 38 is YES, then the billing information is decoded in the execution block 42. The execution then moves to decision block 39, wherein it is determined if a file reference or URL address is present on the document or substrate. If the answer is YES, then the execution accesses the file that is referenced, typically by accessing a remote database over a network connection, and downloads the information at this file reference. Alternatively, or in addition, if a URL address is present, then the execution opens a web browser, for example, and downloads the data at the specified URL address. This data at the file reference or URL address may include billing data, the file location for the original source data for the document to be copied or printed or opened, various additional copy options to be discussed below, and free display information or targeted advertisements to be automatically displayed to persons requesting access to this document.

The execution then moves to block 44 wherein the copy cost for the document maybe displayed to the user by means of a user interface. As noted previously, this display may include a button to allow the user to accept this copy cost. Additionally, this user interface 18 may include various additional copying options and the cost of those options. For example, an additional charge may be levied for accessing and retrieving the original source data or a print ready file from a remote database to thereby create an original high quality copy of the document. Additionally, a user option to select a quality of paper or other substrate may be provided. Additionally, various options may be provided to the user to print information related to the document. For example, a separate charge may be provided for printing an executive summary of the document, or a detailed bibliography, or a more detailed analysis of the topic dealt with in the document, or articles that have been referenced by the document to be copied, or articles that reference the document to be copied. Each one of these possible options could include a user charge next to the option and an ACCEPT button on the user interface display 18. Additionally, the user interface 18 could display the additional information or advertisements obtained from the file reference or URL address during any waiting period or while displaying the cost information.

The execution of the program would then move to block 46 wherein the user would be given a choice of making an authorization for the copying and for the various other options made available at the user interface. Alternatively, this user authorization may be performed remotely or may be automatic. If NO authorization is provided by the user, then the execution moves to step 48 wherein the program returns to its initial setting. If the user provides an authorization for the making of a copy, or a high quality printing, and/or one or more of the other options that may be provided at the user interface, then the execution of the program moves to block 50.

In the execution of block 50, the user may input a user account number, which could be a debit card number or a credit card number or some other type of account from which to deduct the copying license fee and transfer the fee to the user's or owner's account. Alternatively, that particular copy or printing machine may have a preset user account number encoded therein for a plurality of such numbers, which will automatically be accessed and the funds transferred therefrom. Alternatively, the execution 50 could facilitate a cash transaction, wherein the user would insert cash into the machine.

Upon the transfer of funds to the owner's account, or on the payment of cash, the execution would then move to block 52, if that option is provided in the system. At block 52 it is determined whether the user has authorized payment for the retrieval of the original source data or a print ready file. If the answer is YES, then the original print source data or a print ready file is retrieved from the print database 22 and provided to the printer in the system. The next step in the execution at block 54 would be to print an original of the document at a designated location (if that option has been paid for), or to copy or scan the document, or simply to open the document in the application in order to allow edits, depending on the selections made by the user. It should be rioted that the printing, scanning, or copying could take place at a location different from the location of the user interface.

Note that the transfer of funds between a user account and an owner account could be implemented immediately, or periodically, for example weekly or monthly.

Additionally, it should be noted that the billing data may be selected based on a particular parameter. For example, certain users may have negotiated special licensing arrangements with the copyright owner which would entitle them to a different, and possibly lower portion licensing rate for copies or printings. This special licensing rate could be determined based on the location of the user interface. For example, user interfaces for copying located in an educational institution may be provided with lower cost copying and/or printing options.

The present invention in its various aspects and embodiments is advantageous in that it allows for a simple collection of copyright or other royalties without extensive user intervention. This system would thus obviate concerns about copyright infringement, while allowing corporate employees faster access to information, and the option for quality copies and related information.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method, for providing payment when duplicating a document containing copyrighted material, comprising the steps of:

locating and electronically reading a billing mark, if it exists, on a document to be copied or scanned;

obtaining from the billing mark a network reference to a billing file at a remote location on a network;

communicating on the network to the remote location using the network reference and obtaining billing data from the billing file;

displaying a duplicating cost to said user for at least one duplicating option to print additional information stored at the remote location on the network when said document is duplicated and a duplicating cost for printing said additional information; and providing said user with an opportunity to accept or reject printing of said additional information;

authorizing payment of a fee to a copyright owner; and duplicating said document.

2. A method as defined in claim 1, wherein said additional information displaying step comprises displaying an option to print additional information related to said document.

3. A method as defined in claim 1, wherein said additional information displaying step comprises displaying an option to print an executive summary of said document.

4. A method as defined in claim 1, wherein said additional information displaying step comprises displaying an option to print a bibliography.

5. A method as defined in claim 1, wherein said additional information displaying step comprises displaying an option to print at least one article that references said document.

6. A method, for providing payment when duplicating a document containing copyrighted material, comprising the steps of:

locating and electronically reading a billing mark, if it exists, on a document to be copied or scanned;

obtaining a network reference to a billing file at a remote location;

communicating on the network to the remote location using the network reference and obtaining billing data from the billing file;

authorizing payment of a fee to a copyright owner; and duplicating said document, wherein said obtaining billing data step comprises selecting billing data based on an ID of a location where said locating step is performed.

7. A method as defined in claim 6, wherein said selecting step comprises the step of selecting a lower cost if said ID of said location where said locating step is performed is an special licensing institution.

8. A method as defined in claim 6, wherein said locating a billing mark step comprises the step of locating a reference to a remote data location on the network; and further comprising the steps of downloading from said remote data location advertisements; and displaying said advertisements.

9. A system for providing payment when duplicating a document containing copyrighted material, comprising:

logic for locating a computer-readable billing mark, if it exists, on a document to be duplicated;

logic for obtaining a network reference to a billing file at a remote location;

logic for communicating on the network to the remote location using the network reference and obtaining billing data from the billing file;

logic for authorizing payment from a selected account to an account designated in said billing data; and logic for duplicating said document;

wherein said logic for obtaining billing data selects billing data based on an ID of a location where said logic for locating a computer readable billing mark performs a locating operation.

10. A program product for providing payment when duplicating a document containing copyrighted material, comprising machine-readable program code, which when executed, causes the machine to perform the following steps:

locating and electronically reading a billing mark, if it exists, on a document to be copied or scanned;

obtaining a network reference to a billing file at a remote location;

communicating on the network to the remote location using the network reference and obtaining billing data from the billing file;

authorizing payment of a fee to a copyright owner; and duplicating said document, wherein said obtaining billing data step comprises selecting billing data based on an ID of a location where said locating step is performed.

11. A program product for providing payment when duplicating a document containing copyrighted material, comprising machine-readable program code, which when executed, causes the machine to perform the following steps:

locating and electronically reading a billing mark, if it exists, on a document to be copied or scanned;

obtaining from the billing mark a network reference to a billing file at a remote location on a network;

communicating on the network to the remote location using the network reference and obtaining billing data from the billing file;

displaying a duplicating cost to said user for at least one duplicating option to print additional information stored at the remote location on the network when said document is duplicated and a duplicating cost for printing said additional information; and providing said user with an opportunity to accept or reject printing of said additional information;

authorizing payment of a fee to a copyright owner; and duplicating said document.

12. A system for providing payment when duplicating a document containing copyrighted material, comprising:

logic for locating and electronically reading a billing mark, if it exists, on a document to be copied or scanned;

logic for obtaining from the billing mark a network reference to a billing file at a remote location on a network;

logic for communicating on the network to the remote location using the network reference and obtaining billing data from the billing file;

logic for displaying a duplicating cost to said user for at least one duplicating option to print additional information stored at the remote location when said document is duplicated and a duplicating cost for printing said additional information;

logic for providing said user with an opportunity to accept or reject printing of said additional information;

logic for authorizing payment of a fee to a copyright owner; and logic for causing the duplication said document.

13. A computer implemented method, for providing payment when duplicating a document containing copyrighted material, comprising the steps of:

locating and electronically reading a billing mark, if it exists, on a document to be copied or scanned;

obtaining from the billing mark a network reference to a billing file at a remote location on a network;

automatically communicating on the network to the remote location using the network reference and obtaining billing data from the billing file;

authorizing payment of a fee to a copyright owner; and duplicating said document.

14. The method as defined in claim 13, further comprising providing said user with an opportunity to accept or reject payment of the fee.

15. The method as defined in claim 13, wherein the network is the Internet and the network reference is a URL.

16. A program product for providing payment when duplicating a document containing copyrighted material, comprising machine-readable program code, which when executed, causes the machine to perform the steps:

locating and electronically reading a billing mark, if it exists, on a document to be copied or scanned;

obtaining from the billing mark a network reference to a billing file at a remote location on a network;

automatically communicating on the network to the remote location using the network reference and obtaining billing data from the billing file;

authorizing payment of a fee to a copyright owner; and duplicating said document.

17. The program product as defined in claim 16, wherein the network is the Internet and the network reference is a URL.

18. A system for providing payment when duplicating a document containing copyrighted material, comprising:

logic for locating and electronically reading a billing mark, if it exists, on a document to be copied or scanned;

logic for obtaining from the billing mark a network reference to a billing file at a remote location on a network;

logic for automatically communicating on the network to the remote location using the network reference and obtaining billing data from the billing file;

logic for authorizing payment of a fee to a copyright owner; and logic for causing the duplication of said document.

* * * * *